United States Patent [19]

Iwamoto et al.

[11] Patent Number: 4,687,927
[45] Date of Patent: Aug. 18, 1987

[54] PRESSURE MEASURING SYSTEM

[75] Inventors: Katsuharu Iwamoto, Yokohama; Osamu Kawakami, Yokosuka; Hideo Miyagawa, Yokohama; Ikuo Tashiro, Yokohama; Takiji Ishimura, Yokohama, all of Japan

[73] Assignee: Kabushiki Kaisha Toshiba, Kawasaki, Japan

[21] Appl. No.: 790,501

[22] Filed: Oct. 23, 1985

[30] Foreign Application Priority Data

Dec. 13, 1984 [JP] Japan .................................. 59-261723
May 31, 1985 [JP] Japan .................................. 60-116794

[51] Int. Cl.$^4$ .............................................. G01L 9/00
[52] U.S. Cl. .................................... 250/231 P; 73/705
[58] Field of Search ............... 250/227, 231 P, 231 R, 250/229; 73/705

[56] References Cited

U.S. PATENT DOCUMENTS 4,487,206  12/1984  Aagard ............................ 73/705 X

FOREIGN PATENT DOCUMENTS 57-60239  4/1982  Japan .
58-47232  3/1983  Japan .

OTHER PUBLICATIONS

"The Institute of Electrical Engineers of Japan Tokyo Branch Meeting" Paper No: 171; Ohasi et al.; 1981; p. 221.
NASA TMX-3571, "Optical Zero-Differential Pressure Switch and Its Evaluation in Multiple-Pressure Measuring System" J. A. Powell; 1977.

Primary Examiner—Eugene R. LaRoche
Assistant Examiner—Steven J. Mottola
Attorney, Agent, or Firm—Oblon, Fisher, Spivak, McClelland & Maier

[57] ABSTRACT

A pressure measuring system wherein light is transmitted from a light source via a first optical fiber to a pressure-receiving diaphragm having a reflecting surface which undergoes a deflection in relation to the pressure being measured. The diaphragm reflects light transmitted thereto to a second optical fiber which transmits the reflected light to a first photosensitive element. A reference optical fiber is arranged approximately coextensive to the first and second optical fibers and transmits light from the light source in round trip fashion along substantially the same path as light transmitted by the first and second optical fibers to a second photosensitive element. The photosensitive elements produce respective electrical signals which are applied to an operational circuit which eliminates variations in the amount of light due to external disturbances by dividing one electrical signal by the other. With such a construction, it is possible to have a pressure measuring system which is unaffected by electromagnetic induction accompanying large currents and high voltages, which enables more accurate and more sensitive pressure measurements.

10 Claims, 4 Drawing Figures

PRESSURE MEASURING SYSTEM

BACKGROUND OF THE INVENTION

1. Field of the Invention

This invention relates to a pressure measuring system which can strongly resist the effects of electromagnetic induction or the like which accompanies large current and high voltage.

2. Discussion of the Background

In the prior art system employing a pressure gauge of the distortion type, electrical cords for transferring signals are required. These electrical cords are subject to the influence of electromagnetic induction that accompany large currents and high voltages associated with power apparatus and power machines within the plant, and accordingly the output of the prior art system is subject to errors.

One known pressure measuring system which is relatively little affected by the influences of the electromagnetic induction, for example, utilizes optical fibers. In such a pressure measuring system, light from a light source is projected onto a pressure-receiving diaphragm mirror via an optical fiber. The reflected light from the mirror is then projected to photosensitive elements through an optical fiber provided for light reception. Received reflected light is then converted to an electrical signal, and pressure is measured based on the change in the reflected light due to deflection to the diaphragm mirror.

However, in the prior art system of this kind, use is made of an ordinary light source so that the amount of the received light varies due to the light source itself as well as due to vibrations of the optical fibers caused by external forces. Hence there is the drawback that these vibrations in the light reveal themselves as apparent variations in pressure. In addition, because of the absence of dust-preventive measures for the installations section of the diaphragm mirror, stains tend to appear on the diaphragm mirror due to attachment of dust or the like. There is then another drawback that the reduction in the amount of the reflected light due to stains also shows itself as an apparent reduction in the pressure. In particular, due to the fact that both the optical fiber coupled to the light source and the optical fiber receiving reflected light are given no tilt with respect to the normal to the reflecting surface, the amount of reflected light received by the optical fiber for light reception is small, and in fact the reflected amount of light is considerably reduced. Moreover, the reduction in the received light amount sets a limitation on the sensitivity of the measurement obtained.

SUMMARY OF THE INVENTION

Accordingly, the objects of this invention are to provide a novel pressure measuring system which has a sturdy resistance against, and is unaffected by, electromagnetic induction arising due to large currents and high voltages being in close proximity, and which enables one to obtain a more accurate and sensitive pressure measurement.

These and other objects are achieved according to a first embodiment of the pressure measuring system in accordance with the present invention, which includes a light source, an optical fiber associated with the light source for transmitting a light beam from the light source, a pressure-receiving diaphragm which is equipped with a reflecting surface for reflecting the light beam transmitted by the optical fiber, wherein the reflecting surface undergoes a deflection in relation to the pressure to be measured, an optical fiber for light reception which receives the reflected light from the pressure-receiving diaphragm, a reference optical fiber which is arranged substantially coextensively with approximately parallel to the light source optical fiber and the light reception optical fiber, and which transmits a light beam from the light source back and forth along the same path as the light source optical fiber and the optical fiber for light reception, a first photosensitive element which converts the reflected light transmitted by the optical fiber for light reception to an electrical signal, a second photosensitive element which converts the light transmitted by the reference optical fiber to an electrical signal, and an operational circuit which removes the variations due to external disturbances based on the outputs of the first and the second photosensitive elements.

Furthermore, according to a second embodiment of the present invention there is provided a novel pressure measuring system including a light source, an optical fiber associated with the light source for transmitting a light beam from the light source, a pressure-receiving diaphragm which is equipped with a reflecting surface for reflecting light carried by the light source optical fiber, wherein the diaphragm undergoes a deflection in relation to the pressure to be measured, an optical fiber for light reception which receives and transmits the reflected light from the pressure-receiving diaphragm, a photosensitive element which converts the reflected light transmitted by the optical fiber for light reception, and an output adjusting circuit which establishes a linear relationship between the output signal from the photosensitive element and the received pressure, wherein there is set an angle with respect to the normal to the reflecting surface for the light source optical fiber and the optical fiber for light reception in order to make it possible to reflect light from one of said optical fibers to the other irrespective of any deformation of the diaphragm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
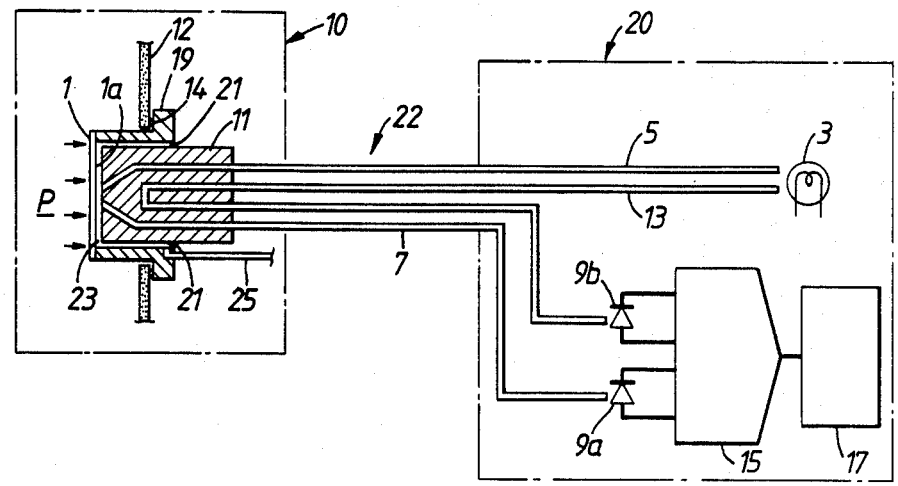
FIG. 1 is a simplified block diagram of a first embodiment of the pressure measuring system in accordance with the present invention.

Referring now to the drawings, wherein like reference numerals designate identical or corresponding parts throughout the several views, and more particularly to FIG. 1 thereof, a first embodiment in accordance with the present invention will be next described.

As shown in FIG. 1, the pressure measuring system of the invention includes a detection section which is attached air-tight to the object 12 to be measured via a sealing material 14, a pressure measuring section 20 which is installed a distance apart from the detection section 10, and which is equipped with a light source, photosensitive elements and processing circuits for outputting the measured value of the pressure, and an optical fiber section which is provided between the detection section 10 and the measuring section 20. Included in the above sections are a pressure-receiving diaphragm 1 which receives pressure P, a light source 3, an optical fiber 5 for light source 3 which transmits the light from the light source 3 to the reflecting surface 1a of the pressure-receiving diaphragm, an optical fiber 7 which transmits the reflected light from the reflecting surface 1a, and a first photosensitive element 9a which converts the reflected light into an electrical signal. In addition, there are provided a reference optical fiber 13 which transmits reference light from the light source 3 back and forth between the light source 3 and the sensor head 11, and a second photosensitive element 9b which converts the reference light into an electrical signal. Furthermore, there is provided an operational circuit 15 which carries out a divisional operation in which the reflected signal output from the first photosensitive element 9a is divided by the reference signal output adjusting circuit 17 which establishes a linear relationship between the output signal from the operational circuit means 15 and the received pressure.

The pressure-receiving diaphragm 1 is attached to the installation part 19 and is designed to undergo a deflection in proportion to the pressure P to be measured upon application of such pressure and based thereon change the direction of the reflected light from the reflecting surface 1a. The reflecting surface 1a may have been processed, for example, by buffer polishing.

The light source 3 can be an ordinary light source such as an LED.

The optical fiber 5 and the optical fiber 7 are installed with a predetermined oblique angle of tilt with respect to the normal to the reflecting surface 1a, and are arranged so as to turn light from one direction into another direction within the sensor head 11. The oblique angular orientation of the fibers 5 and 7 may be constructed such that the above tile is given only to one or the other or both of the optical fibers 5 and 7.

The installation section 19 for the pressurereceiving diaphragm 1 and the sensor head 11 are joined via a sealing section 21, at a position with a predetermined separation between the pressure-receiving diaphragm 1 and the edge surfaces of the optical fiber 5 and the optical fiber 7 in the sensor head 11. This sealing is formed, for instance, by electron beam welding to seal off the space 23 bounded by the reflecting surface 1a and the sensor head 11. The space 23 is connected to a pipe 25 for vacuum pumping. Pipe 25 is blocked up after vaccum pumping is completed to form a pressure measuring system of the absolute pressure type. In pumping the vacuum, a valve, not shown, is installed on the pipe 25. The piper 25 is vacuum pumping is connected through a vacuum apparatus via this valve. After pumping of the space 23 is completed by the operation of the vacuum apparatus, the pipe 25 for vacuum pumping 25 is plugged by squeezing it between the valve and the sensor head 11. While maintaining the plugging, the pipe 25 is cut-off at a position nearer to the valve than the plugged position and welded at the cut-off section.

The reference optical fiber 13 is arranged parallel to the optical fiber 5 and the optical fiber 7 and is substantially coextensive therewith. More particularly, the reference optical fiber 13 is extended along the optical fiber 5, and reaches the sensor head 11. The reference optical fiber 13 reaches to the inside of the sensor head 11 and is folded back and extended along the optical fiber 7 to reach the second photosensitive element 9b.

The first and second photosensitive elements 9a and 9b are constructed in a similar manner and each converts light into a corresponding electrical signal. In other words, elements 9a and 9b convert the light received from the optical fiber 7 and the reference optical fiber 13 to electrical signals respectively corresponding to the amount of light received and apply these electrical signals to the operational circuit 15.

Next, operation of the first embodiment will be described.

The light rays from the light source 3 are irradiated on the reflecting surface 1a by means of the optical fiber 5. The reflected light from the reflecting surface 1a is led by the optical fiber 7 to the first photosensitive element 9a where it is converted to a corresponding electrical signal output. Here, the pressure-receiving diaphragm 1 is deflected in proportion to the pressure P received, which varies the amount of reflected light to be incident from the reflecting surface 1a on the optical fiber 7.

On the other hand, light rays from the light source 3 travel round trip through the reference optical fiber 13, approximately parallel to the optical fiber 5 and the optical fiber 7 and is led to a second photosensitive element 9b. The light received by the second photosensitive element 9b is converted to a corresponding reference electrical signal output.

The reflected signal output and the reference signal output produced by the first photosensitive element 9a and the second photosensitive element 9b, respectively, are input to the operational circuit 15 where division of the reflected signal output by the reference signal output is carried out, and the result is output.

Then, the output from the operational circuit 15 is input to an output adjusting circuit 17 where a linear relationship between the output signal from the operational means 15 is established.

Now, if the amount of light beam when there are no vibrations of the optical fibers 5, 7 and 13 due to external forces, variations in the amount of light from the light source 3, and so forth, that is, when there are no external disturbances, is called I, the amount of the reflected light received by the optical fiber 7 for light reception from the reflecting surface 1a of the pressure-receiving diaphragm 1 which is deflected in proportion to the pressure P it receives may be represented, for instance, by $\alpha I$. Here, $\alpha$ is the rate of change in the amount of received reflected light which is proportional to the pressure P.

Then, if the disturbance coefficient when vibrations exist in the optical fibers 5, 7, and 13 due to external force, and so forth, that is, when external disturbances exist, is called $\beta$, the amount of reflected light from the reflecting surface 1a which is distorted in proportion to the pressure P will become $\beta\alpha I$. The amount of reference light which passes through the reference optical fiber 13 in the is case will be $\beta I$.

Here, the first photosensitive element 9a receives an amount, $\beta\alpha I$, of light from the optical fiber 7, and converts it into an electrical signal, for instance, $\alpha E$ (where $E=\beta I$) which is input to the operational circuit 15. The second photosensitive element 9b receives an amount, $\beta I$, of light from the reference optical fiber 13, and converts it similarly to an electrical signal E which is input to the operational circuit 15. At the operational circuit 15, the following division is performed using these signals $\alpha E$ and E.

$$\alpha E/E = \alpha.$$

Since the result of the divisional operation in the operational circuit 15 is the change in the amount of light received by the pressure-receiving diaphragm 1 in proportion to the pressure P, as was mentioned earlier, the result shows that the elements in the change of the light amount due to external disturbances have been eliminated. Based on the valve of $\alpha$ thus found, its linear relationship with the pressure P received is established in an output adjusting circuit 17.

In this manner, it becomes possible to eliminate apparent pressure variations due to variations in the amount of light from the light source 3 as may be caused by vibrations of the optical fibers due to external forces, and so on, thereby enabling one to obtain more accurate pressure measurements.

In addition, since the optical fiber 5 and the optical fiber 7 in the sensor head 11 are constructed to have a predetermined oblique angle with respect to the normal to the reflecting surface 1a, the amount of reflected light received by the optical fiber 7 is increased in comparison to the prior art pressure measuring system which has an angle of 0° with respect to the normal to the reflecting surface 1a. Consequently, even when a reduction in the amount of reflected light occurs due to stains on the reflecting surface 1a, or the like, the rate of the reduced amount in relation to the total amount of light is low, so that the present system is less susceptible to influence due to reduction in the light amount, and hence it is possible to carry out a more accurate pressure measurement.

Moreover, in the present embodiment the space 23 formed between the reflecting surface 1a and the sensor head 11 is kept in a vacuum state. Therefore, there will be few stains on the reflecting surface 1a. This prevents a reduction in the amount of reflected light due to stains, enabling one to have more accurate pressure measurements. In this case, it is noted that the measuring system will function as a pressure measuring system of the absolute pressure type since the space 23 is kept under vacuum.

Figure 2:
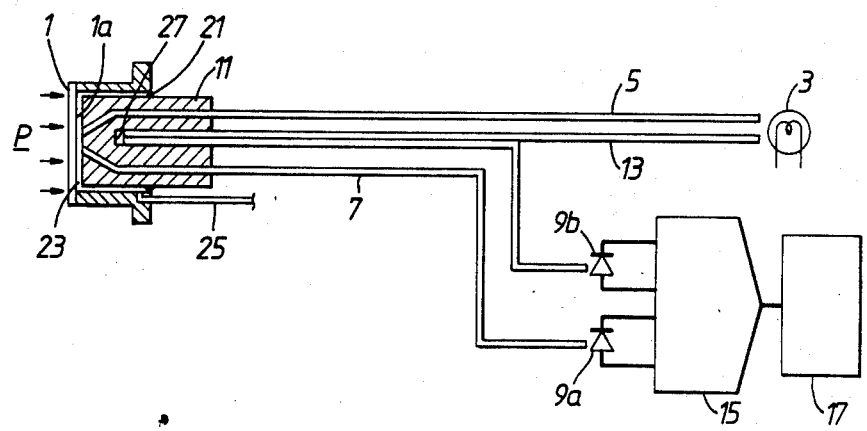
FIG. 2 is a simplified block diagram of a second embodiment of the pressure measuring system in accordance with the present invention.

FIG. 2 shows a second embodiment of the present invention, which unlike the case of the first embodiment is constructed such that the reference optical fiber 13 is disconnected in the sensor head 11, and the reflected light from a wall surface 27 formed in the sensor head 11 is led to the second photosensitive element 9b. The wall surface 27 is given such a mirror surface processing as aluminum evaporation. Therefore, in addition to obtaining the improved pressure measurement as in the first embodiment provides easy assembling of the system. The remaining construction is substantially identical to that of the first embodiment, so that further explanation is omitted.

Figure 3:
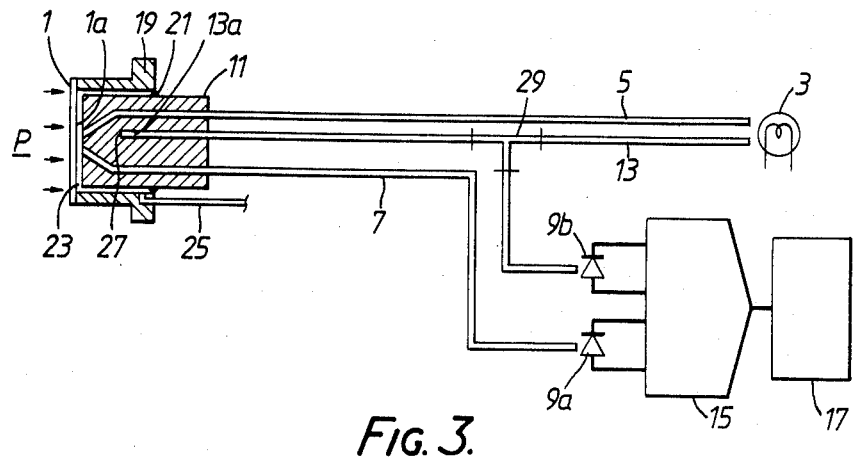
FIG. 3 is a simplified block diagram of a third embodiment of the pressure measuring system in accordance with the present invention.

FIG. 3 relates to a third embodiment of the present invention which shows a further simplification of the invention. In this embodiment, the reference optical fiber 13 is constructed by a single line, and light reflected from the wall 27 in the sensor head 11 is arranged to be branched off by a coupler 29 which is provided at the midpoint in the optical fiber for reference 13, to be led to the second photosensitive element 9b. Therefore, in addition to the fact that the improved pressure measurement of the first embodiment is obtainable, the third embodiment further is easy to construct and makes possible compacting of the system. The manufacture of the system due to this embodiment may further be simplified since the coupler 29 may be constructed as a half mirror, or instead of giving a mirror surface finishing to the wall surface 27, the end surface 13a of the reference optical fiber 13 in the sensor head 11 may be given a mirror surface finishing by means of aluminum evaporation or the like. The remaining construction is substantially identical to the first embodiment and further explanation is therefore omitted.

Figure 4:
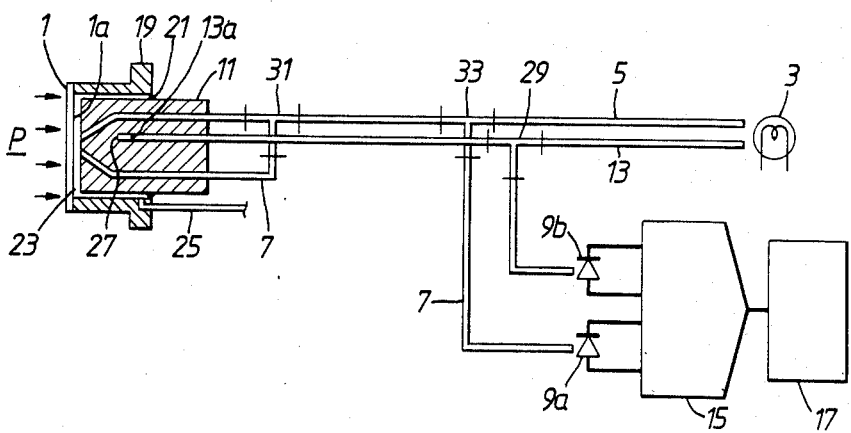
FIG. 4 is a simplified block diagram of a fourth embodiment of the pressure measuring system in accordance with the present invention.

FIG. 4 shows a fourth embodiment of the present invention which is a further simplification of the third embodiment. In contrast to the third embodiment, in this embodiment, two couplers 31 and 33 are placed in the optical fiber 5. Light is branched to the optical fiber 7 from the coupler, 31, while branching to the first photosensitive element 9a is made through the other coupler 33. Therefore, in addition to the fact that effects similar to the third embodiment are obtained, a further compacting of the construction of the system is achieved by the fourth embodiment. The remaining construction is substantially identical to the third embodiment and further explanation is therefore omitted.

It should be noted that the present invention is not limited to the embodiments described in the foregoing. For example, the light source may be replaced by a laser light source. In addition, the optical fiber 5, the optical fiber 7, and reference optical fiber 13 may be constructed of fiber bundles. Further, as the operational circuit 15, use may be made of a multiplicative operational circuit, an additional operational circuit, or a subtractional operational circuit. Still further, strains on the reflecting surface may be prevented by sealing an inert gas in the space 23. In such a case, the pressure measuring system will function as a differential pressure-type system. In this manner, the present invention may be embodied in various modified forms.

In accordance with the first embodiment of the present invention, optical fibers are used for signal transmission so that the system of the invention is insensitive to electromagnetic inductive noise accompanying a large current and a high voltage, which enables accurate pressure measurements. Moreover, when the reflected signal output, which is obtained by converting the reflected light from the reflecting surface of the pressure-receiving diaphragm into an electrical signal, is divided, for example, by the reference signal output derived from reference light which travelled along substantially the same path between the light source and the photosensitive element, it becomes possible to remove the variations in the amount of light from the light source, the variations in the amount of light generated by the vibrations in the optical fibers due to external forces, and so forth. Therefore, apparent pressure variations due to variations in the amount of light can be removed, permitting more accurate pressure measurements.

Furthermore, in the second embodiment of the present invention, the optical fiber 5 and the optical fiber 7 are given an angle with respect to the normal to the reflecting surface in order to direct light at least from one fiber to the other. Thus, the amount of reflected light received by the optical fiber 7 will be increased, and it is made less susceptible to the influence of the reduction in the amount of the reflected light due to stains on the reflecting surface or the like, enabling one to obtain more accurate measurements. Moreover, more sensitive measurements of pressure become possible due to increase in the amount of the reflected light.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A prssure measuring system for measuring pressure, comprising:
    a light source;
    a first optical fiber means for transmitting a light beam from the light source;
    a pressure-receiving diaphragm having a reflecting surface for reflecting light rays transmitted by the first optical fiber means, wherein said reflecting surface undergoes a deflection in relation to the pressure to be measured;
    a second optical fiber means for transmitting light reflected from the pressure-receiving diaphragm;
    a reference optical fiber means arranged substantially coextensive with said first and second optical fiber means for transmitting a beam from the light source in round trip fashion along substantially the same path as travelled by light transmitted by said first and second optical fiber means;
    a sensor head having a first turning section for joining an end section of the first optical fiber means and an end section of the second optical fiber means with a sealed spaced in-between such that said end sections face the reflecting surface of said pressure-receiving diaphragm, said sensor head further having a second turning section for turning light transmitted by said reference optical fiber means;
    a first photosensitive element for converting the reflected light transmitted by said second optical fiber means into an electrical output signal;
    a second photosensitive element for converting light beam transmitted by said reference optical fiber means into an electrical output signal; and
    operational means for eliminating the variations in the amount of light due to external disturbances based on the electrical output signal from said first and said second photosensitive elements and for producing a corresponding output.

2. A pressure measuring system for measuring pressure at the section to be measured, comprising:
    a light source;
    a first optical fiber means for transmitting light from the light source;
    a pressure-receiving diaphragm having a reflecting surface for reflecting light transmitted by the first optical fiber means, wherein said diaphragm underoges a deflection in relation to the pressure to be measured;
    a second optical fiber means for receiving light reflected off the diaphragm and for transmitting the received reflected light from the pressure-receiving diaphragm;
    a sealed enclosure surrounding paths of optical communication between the reflecting surface and end sections of said first and second optical fiber means;
    a photosensitive element for converting the reflected light transmitted by the second optical fiber means into an electrical signal;
    output means for producing an output signal corresponding to the measured pressure based at least in part on said electrical signal;
    wherein at least one of said first and second optical fiber means are arranged at an angle set with respect to the normal to said reflecting surface so that light is reflected to said second optical fiber means even where there is no deformation of said diaphragm;
    a reference optical fiber means arranged substantially coextensive with said first and seocnd optical fiber means for transmitting light from said light source to the vicinity of said diaphragm in round trip fashion along substantially the same path as light transmitted via said first and second optical fiber means;
    said reference optical fiber means comprising a single optical fiber having an end section in the vicinity of said diaphragm;
    means for reflecting light transmitted by said reference optical fiber from said light source to said end section back towards said light source;
    another photosensitive element; and
    a coupler means inserted in said reference optical fiber for branching light reflected back by said reflecting means in said reference optical fiber to said second photosensitive element, said another photosensitive element producing an electrical output signal which is coupled to said output means, said output means producing said output signal based on the electrical output signals from both said photosensitive elements.

3. A pressure measuring system according to claim 1, further comprising:
    output adjusting means for establishing a linear relationship between the output of the operational means and the measured pressure.

4. A pressure measuring system as claimed in claim 1, in which said first turning section comprises means for imparting an angle with respect to a normal to said reflecting surface to at least one of optical fiber means such that light is reflected to said second optical fiber means even when there is no deformation of said diaphragm.

5. A pressure measuring system as claimed in claim 4, in which said space in-between said end sections of said first and second optical fiber means is kept in a vacuum state.

6. A pressure measuring system as claimed in claim 1, in which said second turning section is a wall surface of said sensor head having a mirror surface finishing.

7. A pressure measuring system as claimed in claim 6, wherein said reference optical fiber means comprises:
    an optical fiber; and
    a coupler installed in said reference optical fiber for branching light reflected from said second turning section to the second photosensitive element.

8. A pressure measuring system as claimed in claim 1, further comprising:
    two couplers installed in said first and second optical fiber means, one of the couplers being installed in the vicinity of the sensor head in order to branch off light between the first and second optical fiber means at the sensor head, the other coupler provided for branching the reflected light to the first photosensitive element.

9. A pressure measuring system as claimed in claim 7, further comprising:

two couplers installed in said first and second optical fiber means, one of the couplers being installed in the vicinity of the sensor head in order to branch off light between the first and second optical fiber means at the sensor head, the other coupler provided for branching the reflected light to the first photosensitive element.

10. A pressure measuring system as claimed in claim 4, in which said space in-between said end sections of said first and second optical fiber means is filled with an inert gas.

* * * * *